United States Patent [19]

Zoni

[11] Patent Number: 4,884,313
[45] Date of Patent: Dec. 5, 1989

[54] STREET SWEEPER MACHINE WITH TRASH PICK-UP AND TRANSPORT CAPABILITIES

[75] Inventor: Sergio Zoni, Parma, Italy

[73] Assignee: Dulevo S.p.A., Sanguinaro Di Fontanellato, Italy

[21] Appl. No.: 195,824

[22] Filed: May 19, 1988

[30] Foreign Application Priority Data

May 19, 1987 [IT] Italy .................. 20586 A/87

[51] Int. Cl.⁴ .............................................. E01H 1/02
[52] U.S. Cl. ...................... 15/340.3; 15/348; 180/140
[58] Field of Search .............. 15/340.3, 340.4, 348; 180/140

[56] References Cited

U.S. PATENT DOCUMENTS

| 953,201 | 3/1910 | Harn | 15/348 |
| 1,181,279 | 5/1916 | Williams | 15/348 |
| 1,208,046 | 12/1916 | Talbot | 15/340.3 X |
| 3,202,238 | 8/1965 | Strader | 180/140 |
| 4,269,560 | 5/1981 | Thomas | 180/140 X |
| 4,638,883 | 1/1987 | Moriizumi et al. | 180/140 X |

FOREIGN PATENT DOCUMENTS 2405332  6/1979  France .................. 15/340.3

Primary Examiner—Chris K. Moore
Attorney, Agent, or Firm—Browdy & Neimark

[57] ABSTRACT

A street sweeper machine is provided for picking up and transporting trash comprising a frame having a main longitudinal dimension and engaging from and rear wheels, a driver's cab, motor members, a trash bin, a roll brush located between said wheels and having an axis symmetry parallel to a surface to be cleaned and transverse to said longitudinal dimension, a trash conveyor conveying rash from said roll brush to said bin, and steering members engaging all of said wheels to make all of them steerable and adapted to define an intersect point for the axes of said wheels in cornering which lies proximate a continuation of said axis of symmetry of said roll brush.

12 Claims, 5 Drawing Sheets

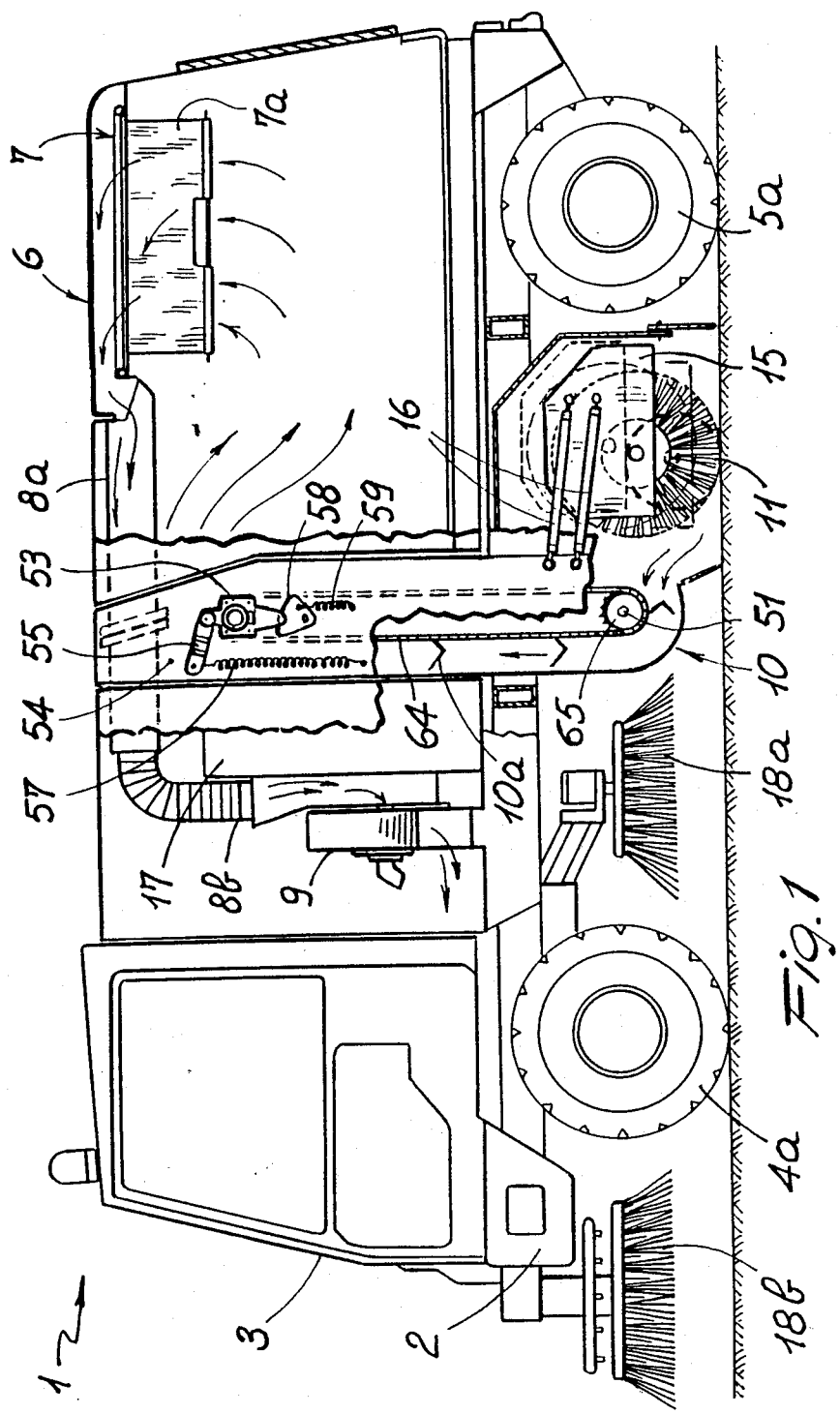

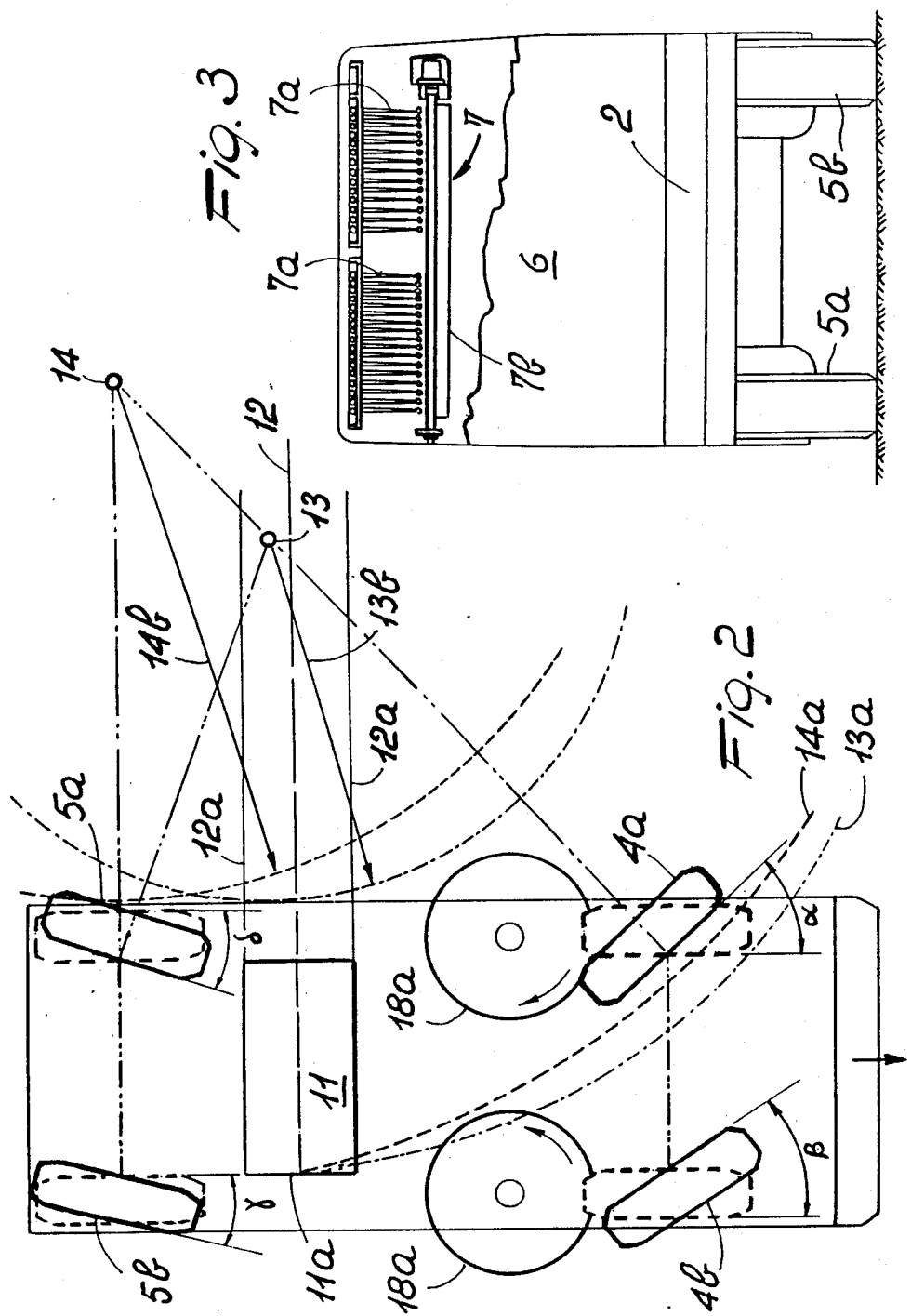

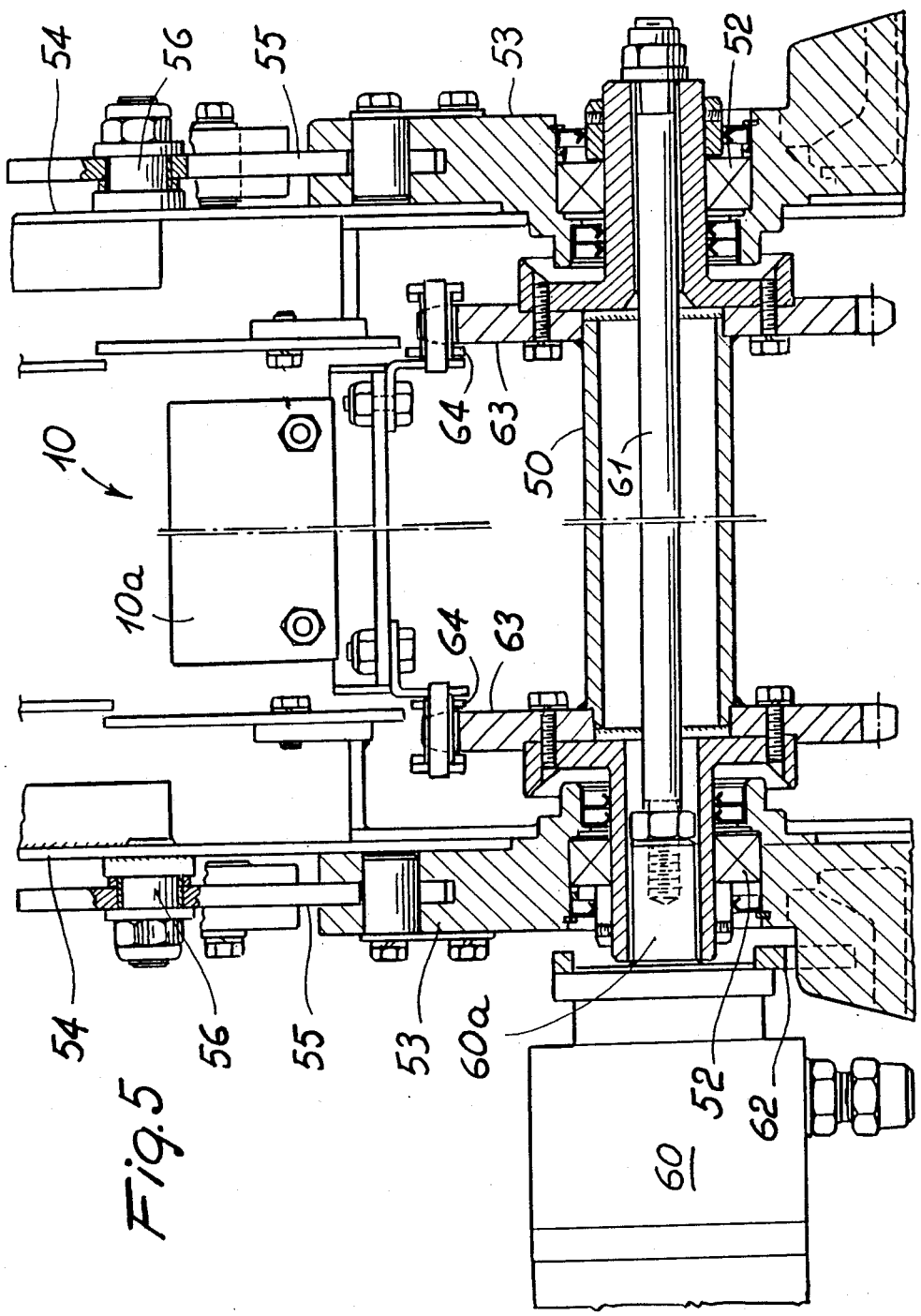

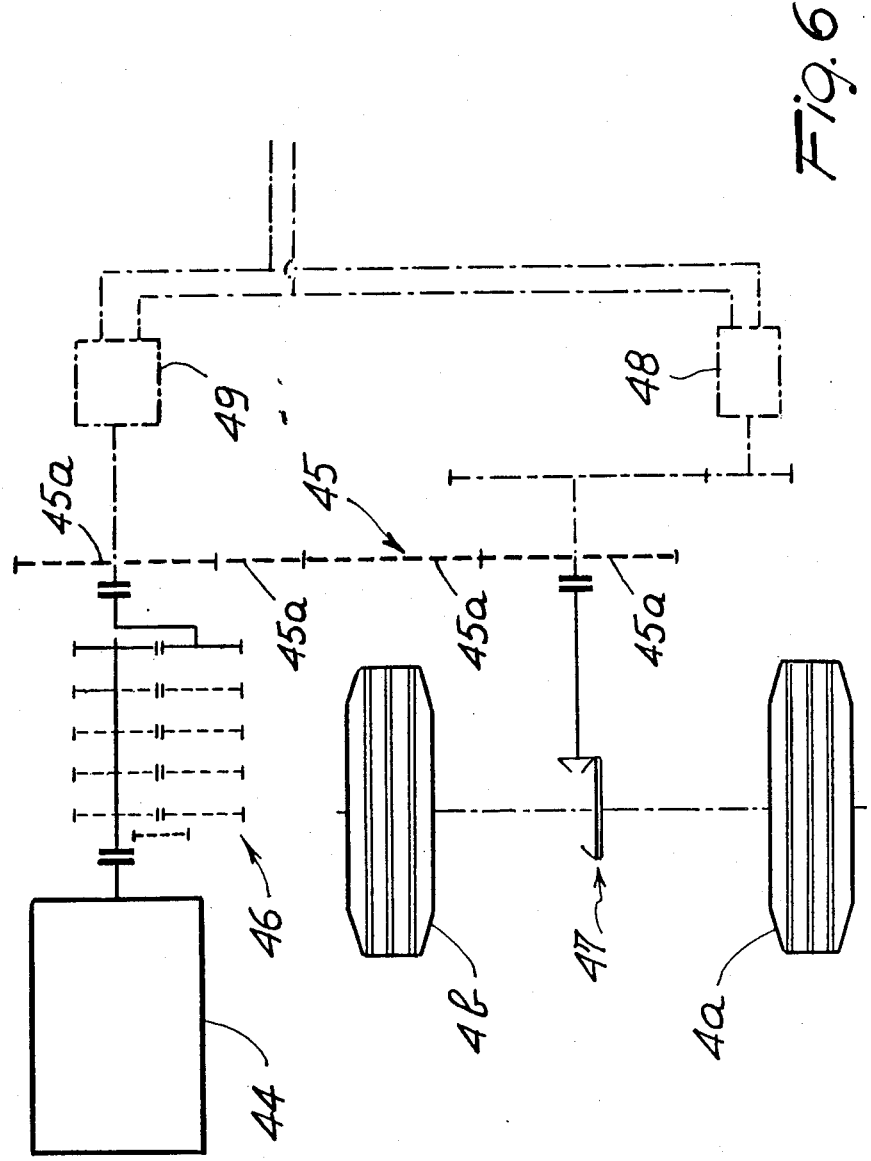

STREET SWEEPER MACHINE WITH TRASH PICK-UP AND TRANSPORT CAPABILITIES

BACKGROUND OF THE INVENTION

1. Field of the Invention This invention relates to a street sweeper machine with trash pick-up and transport capabilities.

2. The Prior Art

As is known, some street sweeper machines designed for large surface sweeping, such as urban surfaces, are configured with a driver's cab, a tank containing water to be delivered to a surface being swept to damp it preparatory to sweeping proper so as to keep down dust, a bin for collecting trash picked up from the ground, brushes in contact with the ground surface, and a trash conveyor operative to receive trash from the brushes and discharge them into the trash bin. The brushes usually include both side and front brushes of frustrum or cup-like shape which are laid with their axis of rotation transverse to a surface to be swept, and a cylindrical or roll brush having its axis of rotation substantially parallel to said surface in a substantially center area of the machine.

The side and front brushes direct trash to the roll brush, and the latter redirects it to said trash conveyor.

The Applicant has made machines of the aforesaid type wherein the trash conveyor is located between the trash bin and the driver's cab, and extends vertically upwards from an area close to the ground surface in order to pick up trash more effectively, thereby the machine is split into two discrete regions: a forward region comprising the driver's cab, the engine, and steering front drive wheels, and a rearward region mostly engaged by the trash bin.

The trash conveyor is formed with plural moving paddles carried on chains and driven thereby, the chains being driven by sprocket wheels which are in turn driven by a specially provided motor.

The machines of the type just described have shown their operability and are quite compact in size for a given load capacity and throughput.

It has been found, however, in actual use that it is sometimes desirable to to increase the machine load capacity and dimensions, and more generally its overall performance.

This because dumping sites and trash incinerators tend to be established at increasingly longer distances from cities, on account of the growing concern for the pollution problems brought about of necessity by dumping sites and incinerators. Likewise, trash conversion plants for reclaiming power or any reusable substances contained therein tend to be established further away from dwelling areas.

As a result, the trash bin should be of sufficient capacity to not only provide for continued operation for many hours a day, but also so that frequent round trips to dumping sites or trash incinerator plants are not required.

Ideally, such a machine should be able to operate for a whole day to pick up trash and only reach the dumping site or incinerator, which may be several kilometers away, at the end of the daily work cycle.

Actual tests carried out by the Applicant have shown that machines of the type as aforesaid cannot be provided by merely enlarging prior machines or their trash bins.

In particular street sweeper machines, in order to carry out with adequate accuracy the basic trash picking up operations, are in the first place required to reach quickly and accurately all the areas to be swept clean, while avoiding the many obstructions encountered. Large size machines cannot move with sufficient nimbleness among the obstructions presented by cities unless a large steering angle is provided for their steering wheels. However, this appears to be irreconcilable with the sweeping operation: with a large steering angle, the paths travelled by the front and side brushes which direct the trash material leave over the ground path marks which do not overlap the path of the substantially centrally located cylindrical or roll brush.

It follows that not only are unswept areas left over the ground but also areas with dust and trash build-ups, that is with trash gathered by the side and front brushes which the roll brush has failed to pick up.

Further, if the steering angle of the wheels is increased, the roll brush, which has its axis of rotation substantially parallel to the ground and perpendicular to the main longitudinal dimension of the machine, may be dragged along paths which involve increased cross skidding thereof over the ground, that is paths having a large component parallel to the axis of the roll brush.

Such skidding movements tend to cause the bristles comprising the roll brush to be flexed towards the axis. It follows that, in tight cornering, the roll brush becomes distorted and flattens along the axis direction, thereby no longer being able to perform correctly its basic function of ground sweeping and above all of directing the trash material to the vertical conveyor. It may be also appreciated that such distortion of the roll brush brings about increased wear of the same and the need for replacement at frequent intervals.

With large size machines, maneuverability is also affected by lack of direct visibility by the driver of the areas being worked upon. The use of a variety of viewing mirrors can only partly remedy this problem.

It should be also noted that if the engine of prior machines is rated higher to afford adequate speed during the trips to dumping sites or incinerators, the net result is again an inadequate piece of machinery with poor street maneuverability.

In fact, in order to carry out the various street sweeping operations, powerplants are required which can operate for long periods at very low speeds, and which can operate at such very low speeds smoothly with no jerky response to controls so that all the movements can be controlled in an easy and accurate manner.

By enlarging prior machines and increasing their power, additional drawbacks are introduced, such as a higher vertical reach of the conveyor where the trash bin is made exceedingly large. This in order to ensure adequate filling of the bin, even when the latter has been filled almost to the brim.

It follows that the chains holding the trash conveyor paddles, which are to nearly span the full height of the bin from an area proximate the ground surface and which are subjected to significant stresses, cannot always be tensioned as is desirable. Slack tensioning results in reduced effectiveness of the conveyor.

Owing to such drawbacks, street sweeping machines of the above-mentioned type are currently made in relatively small sizes and cannot meet the above-noted work demands without involving significant breaks lasting upward of several hours for transporting the picked up trash a long distance at the end of the working cycle.

SUMMARY OF THE INVENTION

This being the situation, the technical task underlying this invention is to devise a machine of the type noted above and of a large size, whereby the cited drawbacks can be substantially overcome.

Within this technical task, it is an important object of this invention to provide a machine which, while having large dimensions, a large load capacity, and adequate travel speed capabilities over roads and highways, is efficient, easily maneuvered, and convenient to control during the street sweeping operations.

The technical task set forth above and the object specified are substantially achieved by a street sweeping machine comprising: a supporting frame having a main longitudinal dimension and engaging at least: front and rear wheels whose axes of rotation converge together in cornering, a drivers' cab, motor members, a trash bin, a roll brush having a symmetry axis substantially parallel to a surface to be swept and lying transversely of said longitudinal dimension, a trash conveyor adapted to convey trash from said roll brush to said bin, and steering members engaging all of said wheels to make them all steering wheels, and adapted in cornering to dispose said wheels with their axes of rotation convergent on a steering center proximate a continuation of said symmetry axis of said roll brush.

BRIEF DESCRIPTION OF THE DRAWINGS

The invention features and advantages will become more clearly apparent from the following description of a preferred embodiment of a machine according to the invention, to be taken in conjunction with the accompanying drawings, where:

FIG. 1 is a partly cut-away side elevation view;

FIG. 2 shows the paths travelled by the brushes of the machine under full steering lock;

FIG. 3 is a partly cut-away rear view showing schematically the machine of FIG. 1;

FIG. 5 is a longitudinal section through the upper portion of the vertical trash conveyor shown in FIG. 1; and FIG. 6 shows schematically some control members.

DETAILED DESCRIPTION OF THE INVENTION

Figure 4:
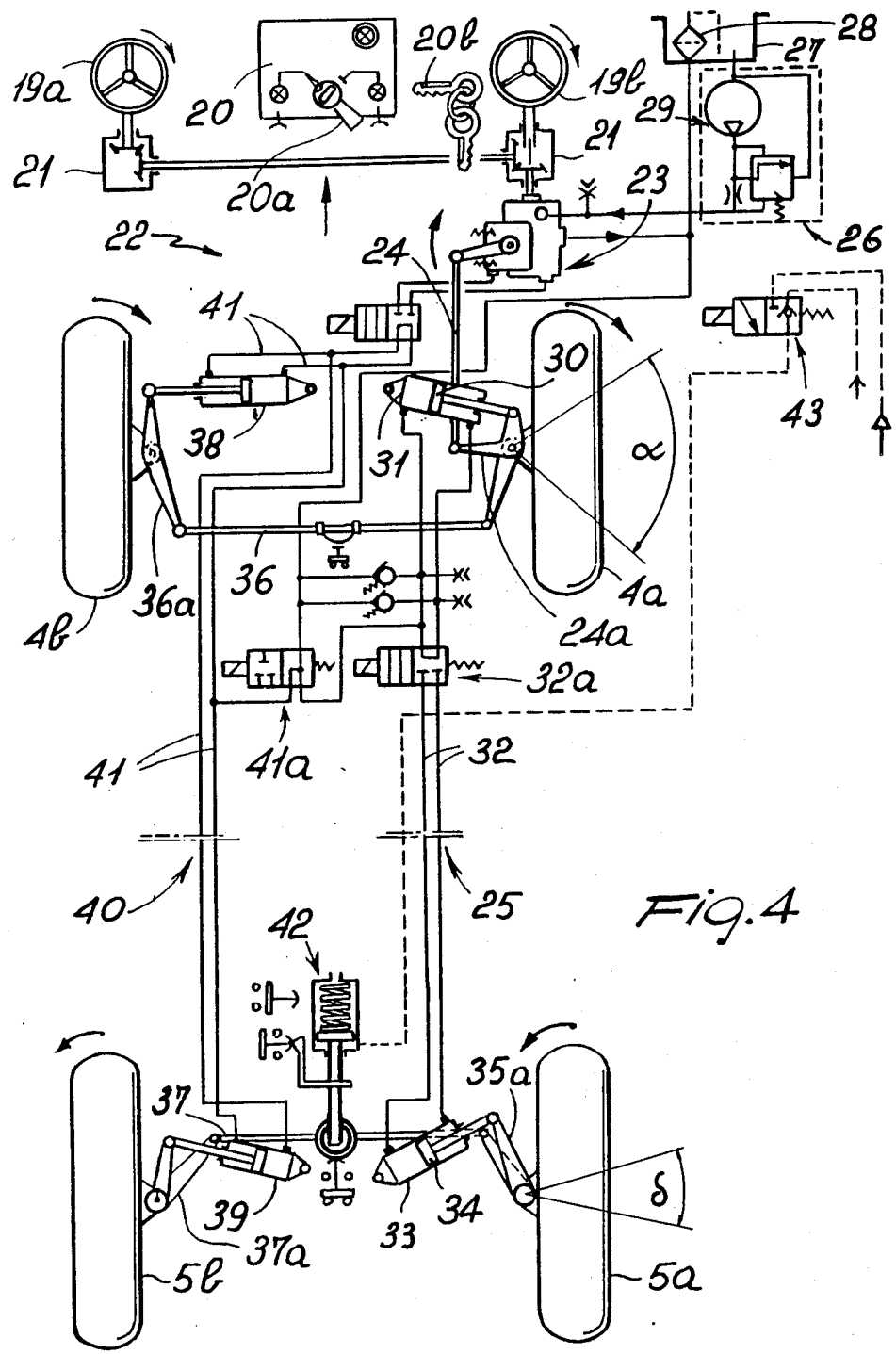
FIG. 4 shows the fluid-operated devices and kinematic elements provided for steering the wheels.

With reference to the drawing views, the street sweeping machine of this invention is generally indicated at 1.

Briefly and with specific reference to FIG. 1, the machine 1 comprises a frame 2 rigid at the top with a driver's cab 3 and at the bottom with two front wheels 4a and 4b, in this specific instance drive wheels, and two rear wheels 5a and 5b. Designated a are the right-hand side wheels and b the left-hand side wheels, relatively to the forward travel direction. Each wheel has, of course, an axis, or axis of rotation, and in steering said axes would converge together.

The frame 2 has a main longitudinal dimension, and this longitudinal dimension coincides in practice with the direction of straight ahead travel of the machine 1. Two longitudinal side frames are provided in parallel with this dimension, a right one and a left one, at which the wheels are located.

The rear portion of the frame 2 is engaged with a trash bin 6 on the interior whereof there are provided, at an elevated location, a bank of filters 7 and a first portion 8a of a suction duct placed downstream of the filter bank 7. A second portion 8b of the suction duct connects the first portion 8a to a suction turbine 9 rigid with the frame 2.

The filter bank 7 comprises a series of modular elements 7a which extend substantially throughout the length of the bin 6 and over a reduced height. The modular elements can be assembled to and disassembled from their seats separately.

A shaker 7b, formed of a rotary rod to which a continuous eccentric elevation is mounted, is located beneath the modular elements 7a and intermittently hits in its rotary movements the filters shaking dust off them.

A trash conveyor 10 extends in a substantially vertical direction forwardly of the bin 6 substantially throughout the width of the frame 2, and is in communication with the bin 6 through a top opening formed in the bin.

Downwardly of the bin 6 and at a slightly rearward location from the conveyor 10, there is the roll brush 11. The roll brush 11 has an axis of symmetry 12, which is also its axis of rotation, lying parallel to the surface to be swept and orthogonally to the main longitudinal dimension of the frame 2 of the machine 1.

A rigid housing 15 holds the roll brush 11 and is supported at each side frame by a pair of oscillatable parallel elements 16 pivoted to the frame so as to form an articulated quadrilateral.

A water tank 17 is provided between the conveyor 10 and the suction turbine 9, and forwardly of the roll brush 11 there are arranged, laterally of the frame, two counter-rotating cup-like brushes 18a for directing the trash toward the roll brush 11. A third, position-adjustable brush 18b is located forwardly of the frame 2.

As shown in FIG. 2, the machine 1 is advantageously equipped with a four-wheel steering, and the front wheel and rear wheel steers are originally coordinated such that the steering center 13 of the machine 1, resulting from the intersection of the straight lines coinciding with the axes of rotation of all the wheels lies proximate a continuation of the axis of the symmetry 12 of the roll brush 11 or at any rate close to the band defined by the generatrix lines 12a of said roll brush 11.

Since the roll brush 11, while being located substantially inwardly of the machine 1, is not normally located intermediate the front and rear wheels, the steering angles alpha and beta of the front wheels 4a, 4b respectively, are different from the steering angles delta and gamma, respectively, of the rear wheels 5a, 5b.

Also shown in FIG. 2 are the paths 13a, 14a travelled in cornering by one end 11a of the roll brush 11 with either steering by all wheels and the steering center 13 proximate the axis 12, or with steering by just the front wheels and hence a second steering center 14 aligned to the rear axle. It may be appreciated that whereas in the former case the swept band of the roll brush 11 overlaps the areas swept by the cup-like brushes 18a, in the latter case a strip is left which is swept by neither the cup-like brushes 18 nor the roll brush 11. Lastly, FIG. 2 shows the two minimum steering radii 13b, 14b, the former, as provided by this invention, being clearly smaller than the latter.

The steering mechanism 22 for the front drive wheels 4a, 4b and the rear wheels 5a, 5b are shown in FIG. 4.

That figure shows that in the driver's cab 3 there may be provided two simultaneous control stations, affording dual control features, or or alternative stations, depending on road traffic regulations, comprising steering wheels alternately 19a and right 19b. Between the two steering wheels, at a center location in the driver's cab 3, a dashboard 20 is provided which can be turned to orientations facing the left steering wheel 19a or right steering wheel 19b as desired. In the instance of dual mode controls, selection of the right or left control stations will depend on viewing range afforded by either for manoeuvering.

Within the dashboard 20, a control knob 20a with a key 20b is provided to set normal front steering or coordinate steering on all the wheels.

Two angle drives 21 connect the steering wheels 19a and 19b and to steering mechanism 22 which comprise, first of all, an oil-operated steering system 23, known per se, which is supplied oil under pressure by a unit 26 including a reservoir 27, filter 28, and pump 29.

The oil-operated steering system 23 controls the front right wheel 4a via kinematic elements or linkages 24 which are led to first levers 24a engaging the wheel 4a directly.

One end of said first levers 24a is engaged with the rod of a first piston 30 movable inside a first oil-operated cylinder 31. The first cylinder 31 is in oil communication via two first lines 32 to a similar second oil-operated cylinder 33 having a second piston 34 whose rod is engaged by second levers 35a with the right rear wheel 5a.

The first and second cylinders 31, 33 form with the first piping 32 a first fluid-operated device 25 which is closed and rigidly linked with the first levers 24a, as well as adapted to provide rigid coordination of the steering of the wheels 4a and 5a placed on the same longitudinal side of the frame 2, in the example shown the right-hand side, engaged by the right wheels 4a,5a. In practice, the elements 31,32,33 form a rigid "hydraulic bar"; for each movement of the piston 30 in the first cylinder 31 there must strictly correspond a movement of the second piston 34 in the second cylinder 33.

Thus, the trash conveyor 10, which essentially operates as a "diaphragm" between the front and rear wheels due to its width dimension which, as set forth above, expediently approximates that of the frame 2, is avoided, while the front and rear wheels are nonetheless stably interconnected. Also provided are front transfer elements 36 and rear transfer elements 37, all of a mechanical nature, which coordinate the steering actions of the front wheel 4b and the rear wheel 5b, respectively.

The front transfer elements 36 extend from the first levers 24a and are led to third levers 36a engaged directly with the left front wheel 4b.

The rear transfer elements 37 extend from the second levers 35a and are led to fourth levers 37a engaged directly with the left rear wheel 5b.

A second fluid-operated device 40 is arranged to connect to the oil-operated steering system 23 and extends along the left side of the frame 2 opposedly from the side engaged by the hydraulic bar. This second fluid-operated device 40 comprises a third cylinder 38 engaged with the third levers 36a of the left front wheel 4b, a fourth cylinder 39 engaged with the fourth levers 37a of the rear wheel 5b, and second piping 41 interconnecting the cylinders 38 and 39.

A lock assembly 42, advantageously comprising air-operated members, is operative to lock the rear transfer elements 37 when the steering system for the rear wheels 5a and 5b is to be deactivated, such as on the occasion of trips at relatively high speeds.

The compressed air is supplied to the lock assembly 42 from a first electric air distributor 43.

With the rear wheels locked, a second electric distributor 41a is operated to act via the pipes 41 and 32 to deactivate the second and fourth cylinders, 33 and 39.

It should be also pointed out that FIG. 4 shows a third electric distributor 32a connected in the first piping 32 to control the oil flow therethrough.

The machine 1 is driven forward by means of motive members comprising two motors as shown in FIG. 6. A first gasoline engine 44 enables fast forward driving of the machine 1 via connections generally indicated with both full and dash lines and comprising a drive 45 having a set of gear wheels 45a which receive their motion from a gearbox or speed transmission 46 and transfer it to a differential gear 47.

For slow speed forward travel, the machine 1 uses a second hydraulically operated motor 48 operated from a pump 49 driven off the gearbox 46 with the top speed gear engaged. In this case, the connections shown by the dash-and-dot lines in FIG. 6 are engaged and the drive 45 shown in dash lines and including the gear wheels 45a is disengaged.

FIGS. 1 and 5 show then that the vertical trash conveyor 10 comprises a driveshaft 50 at an upper location and a layshaft 51 at a lower location. The driveshaft 50 is mounted on two self-aligning bearings 52, in turn carried on two movable plates 53. The movable plates 53 can move vertically across the walls 54 of the conveyor 10 and are pulled upwards by tensioning members. The latter comprise, at each wall 54, a lever 55, a trunnion 56 welded to the wall 54 and supporting the lever, and a first spring 57 engaging one end of the lever 55.

Also provided is a cam 58 which urges the respective movable plate 53 and is stabilized by a second spring 59. In actual practice, the cam 58 is used to effect the initial or resisting basic positioning and the lever 55 to adjust for any slackening.

The driveshaft 50 is hollow and carries at one end a pin shaft 60a of a small hydraulic motor 60, held abutting the driveshaft 50 by a screw link 61. It follows that there is no direct connection between the movable plate 53 and the hydraulic motor 60. A key 62 prevents rotation of the hydraulic motor 60, while allowing it to move on the driveshaft 50 being lowered and raised. A pair of first sprocket wheels 63 are fast with the driveshaft 50 proximate its ends and carry two chains 64 which are also trained around second sprocket wheels 65 engaged on the layshaft 51. Paddles 10a are attached to the chains 64 for receiving trash material from the roll brush 11 and discharging it into the bin 6.

The machine 1 operates as follows.

At the operator's choice, either all the wheels or just the front wheels can be made to steer. Steering by all wheels is contemplated, however, for sweeping operations.

In summary, the steering mechanism 22 acts, via the oil-operated steering system 23, on the right front wheel 4a, whence via the first fluid-operated device 25 the command to steer is transferred to the right rear wheel 5a.

Mechanical transfer elements 36,37 then coordinate the movements of the right front wheel 4a to the left front wheel 4b, and of the right rear wheel 5a to the left rear wheel 5b.

The second fluid-operated device 40 is finally operated to interlink the left front wheel 4b and left rear wheel 5b.

The fluid-operated devices 25 and 40 and transfer elements 36,37 engage the wheels via levers 24a,35a,36a,37a, and it is the size of the latter that determines the steering angle for each wheel.

Once the position of the roll brush 11 is known relative to the wheels, said levers are sized, according to the invention, to provide steering angles alpha, beta, gamma, and delta effective to cause the wheel axes to converge to a point close to the straight line defined by the axis of symmetry 12 of the roll brush 11. The steering center formed by the intersection of the wheel axes shall then be more or less close to the frame 2 of the machine 1 depending on the extent of the steering action.

During the sweeping operations, the most appropriate control station is used in relation to the direct visual monitoring of the sweeping operations, and the machine 1 will use for its propulsion the hydraulic motor 48 which ensures flexibility and simplicity in steering at very low speeds. On the other hand, during road trips to the dumping sites or incinerators, the gasoline engine 44 is used, and steering on the rear wheels can be locked. Even where the bin 6 is of a large size, the introduction of trash into the bin can take place efficiently by means of the conveyor 10, whose construction is unconditioned by the presence of mechanical connections between the front and rear wheels, and whose chains 64 are kept at all times taut because the motor 60 follows any oscillations of the chain driveshaft 50.

It should be also noted that the position of the roll brush 11 is at all times maintained correctly not only because the steering center of the machine 1 is at all times proximate the continuation of the roll brush axis but also because the contact with the ground is always exactly calibrated due to the articulated quadrilateral formed by the oscillatable elements 16.

The presence of said articulated quadrilateral also allows the roll brush 11 to be raised while travelling on the road, using the motor 44.

The invention achieves important advantages.

In fact, maneuverability of the sweeper machine is high despite its large size.

The steering method used for the wheels, with different steering angles of the front wheels from those of the rear wheels and the steering center proximate the roll brush axis, affords proper skidding of the roll brush over the ground even in tight cornering maneuvers. It follows that the roll brush 11 undergoes no distortion in a direction parallel to its axis, such as would tend to damage it and reduce its efficiency and durability. Further, there are no unswept areas and no trash traces are left over the ground.

The steering devices employed enable coordinated steering on all the wheels in an accurate manner, overcoming the diaphragm created by the presence of the trash conveyor.

In fact the connection piping for the fluid-operated steering devices takes up little space and can be routed through long twisting paths without difficulty.

Propulsion of the machine with two different motors meets the requirement for high travel speeds where required and low, easily controlled speeds during the sweeping work.

Note should be taken that the first gasoline engine need not be stopped with the second motor in operation, and that in order to vary the drive to the drive wheels it is sufficient to engage or disengage mechanical members.

I claim:

1. A street sweeper machine for picking up and transporting trash, comprising: a frame having a main longitudinal dimension and engaging at least front and rear wheels having axes of rotation which converge together in cornering, a driver's cab, motor means, a trash bin, a roll brush having an axis of symmetry substantially parallel to a surface to be swept and transverse to said longitudinal dimension, a trash conveyor adapted to convey trash from said roll brush to said bin, and a steering mechanism engaging all said wheels to make them all steering wheels, and adapted in cornering to dispose said wheels with their axes of rotation convergent on a steering center proximate a continuation of said axis of symmetry of said roll brush.

2. A machine according to claim 1, wherein said steering mechanism is adapted to define steering angles for said front wheels and steering angles for said rear wheels which differ from each other, said roll brush being offset from an intermediate position to said front wheels and said rear wheels.

3. A machine according to claim 1, wherein said steering mechanism comprises at least one fluid-operated means for steering said front and rear wheels having first and second cylinder for engaging at least one of said front wheels and at least one of said rear wheels, respectively, and having first piping for connecting said first and second cylinders on one side of said frame parallel to said longitudinal dimension to one another, said frame being through-penetrated, transversely of said longitudinal dimension, by said trash conveyor.

4. A machine according to claim 3, wherein said steering mechanism comprises: first and third levers for selectively engaging said front wheels, second and fourth levers for selectively engaging said rear wheels, an oil-operated steering system for engaging during cornering, via said first levers and alternatively said third levers, one of said front wheels, and a first mechanism transfer element engaging said front wheels with one another and a second mechanical transfer element engaging said rear wheels with one another.

5. A machine according to claim 4, wherein said at least one fluid-operated means further comprising a second fluid-operated device having third and fourth cylinders engaging one of said front wheels and one of said rear wheels, respectively, selected to be independent said first fluid-operated device, said second fluid-operated device comprising second piping extending along a side of said frame independent of said first piping for connecting said third and fourth cylinders.

6. A machine according to claim 3, wherein said steering mechanism comprises a lock assembly operating connected to said rear wheels and controllable in operation to lock said rear wheels against steering, said lock assembly being arranged to make the machine stable during road travelling.

7. A machine according to claim 3, further comprising two steering wheels in said driver's cab to control said steering mechanism, said two steering wheels being disposed side by side along a transverse direction to said longitudinal dimension, and a dashboard intermediate to said steering wheels and pivotable toward the same.

8. A machine according to claim 3, wherein said trash conveyor transversely engaging said frame comprises transport paddles for receiving trash material from said roll brush and discharging it into said bin, chains engaging said paddles for moving said paddles, a driveshaft disposed at an upper location with respect to said conveyor, a layshaft disposed at a lower location with respect to said conveyor engaging sprocket wheels, said chains being trained around said sprocket wheels, a drive motor for rotating said driveshaft carried directly on said driveshaft, movable plates for supporting said drive shaft and tensioning means for pulling said movable plates.

9. A machine according to claim 8, wherein said tensioning means comprises, at each end of said driveshaft, a lever, a fixed trunnion to which said lever is pivoted, and a first spring acting on said lever, with the latter active on one of said movable plates, and further comprising a cam adapted to move said one movable plate and a second spring for locating said cam in position.

10. A machine according to claim 8, wherein said roll brush is positioned between said trash conveyor and said rear wheels, and further comprising oscillatable elements for supporting said brush which are journalled on said frame and arrange to form an articulated quadrilateral.

11. A machine according to claim 1, wherein said motor means comprises a first gasoline engine for fast travelling and a second hydraulically operated motor for slow forward movement of the machine at work.

12. A machine according to claim 11, further comprising a pump and a drive intervening between said first engine and said pump, said drive being controllable to disengage for selectively controlling said second motor.

* * * * *